United States Patent [19]

Fuxe

[11] 3,917,841
[45] Nov. 4, 1975

[54] METHOD FOR TREATING LIBIDO DISORDERS

[75] Inventor: Kjell Fuxe, Sollentuna, Sweden

[73] Assignee: Nelson Research & Development Co., Irvine, Calif.

[22] Filed: June 3, 1974

[21] Appl. No.: 475,857

[52] U.S. Cl. .................. 424/267; 424/319; 424/330
[51] Int. Cl.$^2$ ............... A61K 31/135; A61K 31/195; A61K 31/445
[58] Field of Search ........................... 424/330, 267

[56] References Cited
OTHER PUBLICATIONS

American Drug Index, 1969, p. 448.

Chem. Abst. (1), 53—14352G, (1959).
Chem. Abst. (2), 62—5770H, (1965).

*Primary Examiner*—Stanley J. Friedman
*Attorney, Agent, or Firm*—Martin A. Voet

[57] ABSTRACT

A method for temporarily enhancing libido in animals comprising administering to an animal an effective amount of a dopamine blocking compound and optionally administering simultaneously or concurrently an effective amount of a noradrenaline potentiating compound.

2 Claims, No Drawings

METHOD FOR TREATING LIBIDO DISORDERS

BACKGROUND OF THE INVENTION

1. Field of the Invention

The invention generally relates to a method for enhancing libido.

2. Background of the Prior Art

Libido is a medical term for sexual desire. Aphrodisiacs are drugs which enhance libido, that is, arouses the sexual instinct. Aphrodisiacs are used commercially for breeding purposes. Various libido disorders exist in man and include frigidity and impotance.

SUMMARY OF THE INVENTION

It would be desirable to have a composition useful as an aphrodisiac and also useful in the treatment of disorders of the libido.

The present invention relates to a method for temporarily enchancing libido in animals comprising administering to an animal an effective amount of a dopamine blocking compound and optionally administering simultaneously or concurrently an effective amount of a noradrenaline potentiating compound.

The present invention also relates to a composition comprising about 5–90 percent of a dopamine blocking compound and about 5–90 percent of a noradrenaline potentiating compound and the balance comprising a suitable pharmaceutical carrier.

DETAILED DESCRIPTION OF THE INVENTION

Compounds which block dopamine in the central nervous system include pimozide, fluspririlene and spiroperidol, all of which compounds are known, e.g. Cutting's Handbook of Pharmacology, 5th ed.

Compounds which potentiate noradrenaline in the central nervous system include amphetamines such as, for example, Benzedrine (amphetamine sulfate), Dexedrine (dextroamphetamine sulfate), Methedrine (methamphetamine hydrochloride) and Fenfluramine; levodopa, adamantin, piperoxan, pemaline, tranylcypromine and especially the (−) enantiomer of tranylcypromine, aletamine, amphonelic acid, cypenamine, encyprate, femcamfamin, fenozalone, fenmetramide, prolintane HCl, rolicyprine, thozolinone and zylofuramine, all of which compounds are known, e.g, Cutting's Handbook of Pharmacology, 5th ed.

The amount of dopamine blocking compound and noradrenaline potentiating compound which may be used in the present invention each varies from about 0.05 mg to about 500 mg/kg and preferably from about 1 mg to about 250 mg/kg per day, bearing in mind, of course, that in selecting the appropriate dosage in any specific case, consideration must be given to the patient's weight, general health, metabolism, age and other factors which influence response to the drug. The compounds may be administered in combination or concurrently. That is, the compounds may be given together in one formulation or may be given at about the same time in separate formulations.

While applicant does not rely on the following theory, it is applicant's belief that the composition of the present invention simultaneously inhibits dopamine and potentiates noradrenaline in the central nervous system and that this action results in an enhanced libido.

As used herein, the term "animals" refers generally to warm blooded animals and especially domesticated and commercial animals, and includes humans.

The pharmaceutical compositions may be in the form suitable for oral use, for example, as tablets, aqueous or oily suspensions, dispersible powders or granules, emulsions, hard or soft capsules, or syrups or elixirs. Compositions intended for oral use may be prepared according to any method known to the art for the manufacture of pharmaceutical compositions and such compositions may contain one or more agents selected from the group consisting of sweetening agents, flavoring agents, coloring agents and preserving agents in order to provide a pharmaceutically elegant and palatable preparation. Tablets contain the active ingredient in admixture with non-toxic pharmaceutically acceptable excipients which are suitable for manufacture of tablets. These excipients may be, for example, inert diluents, for example calcium carbonate, sodium carbonate, lactose, calcium phosphate or sodium phosphate; granulating and disintegrating agents, for example maize starch, or alginic acid; binding agents, for example starch, gelatine or acacia, and lubricating agents, for example magnesium stearate or stearic acid. The tablets may be uncoated or they may be coated by known techniques to delay disintegration and absorption in the gastrointestinal tract and thereby provide a sustained action over a longer period.

Formulations for oral use may also be presented as hard gelatine capsules wherein the active ingredient is mixed with an inert solid diluent, for example calcium carbonate, calcium phosphate or kaolin, or as soft gelatine capsules wherein the active ingredient is mixed with an oil medium, for example arachis oil, liquid paraffin or olive oil.

Aqueous suspensions contain the active ingredients in admixture with excipients suitable for the manufacture of aqueous suspensions. Such excipients are suspending agents, for example sodium carboxymethyl cellulose, methylcellulose, hydroxypropylmethylcellulose, sodium alginate, polyvinylpyrrolidone, gum tragacanth and gum acacia; dispersing or wetting agents may be a naturally-occurring phosphatide, for example lecithin, or condensation products of an alkylene oxide with fatty acids, for example polyoxyethylene stearate, or condensation products of ethylene oxide with long chain aliphatic alcohols, for example heptadecaethyleneoxycetanol, or condensation products of ethylene oxide with partial esters derived from fatty acids and a hexitol, for example polyoxyethylene sorbitol monooleate, or condensation product of ethylene oxide with partial esters derived from fatty acids and hexitol anhydrides, for example polyoxyethylene sorbitan monooleate. The said aqueous suspensions may also contain one or more preservatives, for example ethyl, or n-propyl, p-hydroxy benzoate, one or more coloring agents, one or more flavoring agents and one or more sweetening agents, such as sucrose, saccharin, or sodium or calcium cyclamate.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example, sweetening, flavoring and coloring agents, may also be present.

Syrups and elixirs may be formulated with sweetening agents, for example glycerol, sorbitol or sucrose. Such formulations may also contain a demulcent, a preservative and flavoring and coloring agents. The pharmaceutical compositions may be in the form of a sterile injectable preparation, for example as a sterile injectable aqueous suspension. This suspension may be formulated according to the known art using those suitable dispersing or wetting agents and suspending agents which have been mentioned above. The sterile injectable preparation may also be a sterile injectable solution or suspension in a non-toxic parenterally-acceptable diluent or solvent, for example as a solution in 1,3-butane diol.

The pharmaceutical compositions may be tableted or otherwise formulated so that for every 100 parts by weight of the composition there are present between 5 and 95 parts by weight of the active ingredient and preferably between 25 and 85 parts by weight of the active ingredient. The dosage unit form will generally contain between about 100 mg. and about 500 mg. of the active ingredient of the formula stated above.

From the foregoing formulation discussion, it is apparent that the compositions of this invention can be administered orally or parenterally. The term parenteral as used herein includes subcutaneous injection, intravenous, intramuscular, or intrasternal injection or infusion techniques.

This invention is further demonstrated by the following examples in which all parts are by weight.

hours before observation. (c) Chlorpromazine, 5 mg/kg (s.c.) 90 minutes before observation. (d) D-amphetamine sulphate, 3 mg/kg (s.c.) 90 minutes after pimozide or 60 minutes after spiroperidol or chlorpromazine, i.e. 30 minutes before observation. (e) Parachlorophenylalanine-methyl ester HCl (PCPA-methyl ester HCl), 150 mg/kg base (s.c.) 2–4 hours; 26–28 hours; 50–52 hours before observation. (f) Alpha-methyl-p-tyrosine (AMPT), 100 mg/kg (s.c.) 2–4 hours before observation.

Behavioral observations were made by placing each female with 2 cage-adapted, sexually experienced males for a 5-minute period during which about 20 mounts occurred. The following measures were recorded: 1. Proportion of mounts by the male which elicited a lordosis response — L/M; 2. Lordosis intensity measured on a 3 point scale; 3. Lordosis duration (in seconds); 4. Female acceptance ratio — No. of mounts ÷ No. of refused mounting attempts + mounts, a measure of the female's willingness to accept the male when he attempts to mount her.

As seen from Table 1, pimozide, a potent dopamine (DA) receptor blocking agent, caused a significant increase in all measures of the female's sexual behavior, but particularly in the mean duration of lordosis responses (Table 1). These effects were enhanced by a noradrenaline potentiator, D-amphetamine. Spiroperidol, a DA receptor blocker, in combination with amphetamine produced effects similar to those with pimozide/amphetamine.

Table 1

Effects of various pharmacological agents on the sexual receptivity of estrogen-treated female rats (L/M = No. of lordoses ÷ No. of mounts by male; LI = lordosis intensity; LD = lordosis duration in seconds; AR = acceptance ratio). Values are median ± semiquartile deviation. Statistical analysis, treatment vs. control, Mann-Whitney 'U' test. ns = not significant; x $p<0.05$; xx $p<0$ xxx $p<0.001$

| Treatment | N | L/M | LI | LD | AR |
|---|---|---|---|---|---|
| Pimozide | 10 | 0.66 ± 0.05ˣˣˣ | 1.94 ± 0.05ˣˣ | 2.00 ± 0.33ˣˣˣ | 0.95 ± 0.05ˣˣ |
| Control | 5 | 0.27 ± 0.25 | 1.50 ± 0.11 | 0.60 ± 0.04 | 0.78 ± 0.12 |
| Pimozide + Amphetamine | 10 | 0.84 ± 0.10ˣˣˣ | 1.88 ± 0.09ˣˣ | 2.08 ± 0.31ˣˣˣ | 1.00 ± 0.02ˣˣ |
| Control | 5 | 0.27 ± 0.25 | 1.50 ± 0.11 | 0.60 ± 0.04 | 0.78 ± 0.12 |
| Spiroperidol + Amphetamine | 10 | 0.86 ± 0.16ˣˣˣ | 2.06 ± 0.15ˣˣ | 1.68 ± 0.34 ˣˣˣ | 1.00 ± 0.02ˣˣˣ |
| Control | 5 | 0.11 ± 0.13 | 1.57 ± 0.09 | 0.55 ± 0.02 | 0.87 ± 0.07 |
| α-methyl-p-tyrosine | 10 | 0.68 ± 0.05ˣˣˣ | 2.00 ± 0.06ˣˣˣ | 1.22 ± 0.28ˣˣ | 0.76 ± 0.09ⁿˢ |
| Control | 5 | 0.11 ± 0.13 | 1.57 ± 0.09 | 0.55 ± 0.02 | 0.87 ± 0.07 |
| Chlorpromazine + Amphetamine | 10 | 0.00 ± 0.42ⁿˢ | — | — | 1.00 ± 0.17ˣˣ |
| Control | 5 | 0.11 ± 0.13 | — | — | 0.87 ± 0.17 |
| Para-chlorophenylalanine (2 – 4 hours) | 10 | 0.85 ± 0.07ˣˣˣ | 1.97 ± 0.15ˣˣˣ | 0.97 ± 0.09ˣˣˣ | 0.83 ± 0.97ⁿˢ |
| Control | 5 | 0.18 ± 0.12 | 1.50 ± 0.13 | 0.51 ± 0.05 | 0.70 ± 0.07 |
| Para-chlorophenylalanine (48 – 50 hours) | 10 | 0.84 ± 0.11ˣˣˣ | 2.20 ± 0.20ˣˣˣ | 1.34 ± 0.15ˣˣˣ | 0.73 ± 0.06ⁿˢ |
| Control | 5 | 0.19 ± 0.20 | 1.19 ± 0.13 | 0.42 ± 0.08 | 0.61 ± 0.12 |

EXAMPLE I

Animals used were ovariectomized or ovariectomized/adrenalectomized Sprague-Dawley rats (Specific Pathogen Free-Anticimex, Stockholm) weighing 250–300 gms. They were housed, 5 per cage, in a room maintained at a temperature of 24°C under reversed lighting (10 hours dark). Food and water (or saline) were available ad libitum. All females were injected daily with 2.5 μg/kg estradiol monobenzoate throughout the experiment. Drug treatments were as follows:

(a) Pimozide, 1–2 mg/kg (i.p.) 2–3 hours before observation. (b) Spiroperidol, 0.25 mg/kg (s.c.) 2–3

I claim:

1. A method for enhancing libido in female domesticated animals for improved breeding purposes comprising administering to a domesticated female animal prior to breeding about 1 to about 250 mg/kg of a dopamine blocking agent selected from the group consisting of pimozide, fluspirilene and spiroperidol.

2. A method for temporarily enhancing libido in animals comprising administering to an animal an effective amount of pimozide together with a suitable pharmaceutical carrier.

* * * * *